Patented Feb. 5, 1952

2,584,367

UNITED STATES PATENT OFFICE 2,584,367

PROCESS OF PREPARING 3-HALO-9-PHTHALIMIDOMETHYL BENZANTHRONE

David I. Randall and Saul R. Buc, Easton, Pa., assignors to General Aniline & Film Corporation, New York, N. Y., a corporation of Delaware No Drawing. Application November 3, 1950, Serial No. 194,011

3 Claims. (Cl. 260—326)

This invention relates to 3-halo-9-phthalimidomethyl benzanthrone, and particularly to a process of preparing the same.

The compound, 3-halo-9-phthalimidomethyl benzanthrone is a highly desirable dyestuff intermediate for the preparation of the valuable dye, 16 H-anthra[9,2,1-anm]naphth[2,3-h]acridine-5,10,15-trione, which is presumably characterized by the following formula:

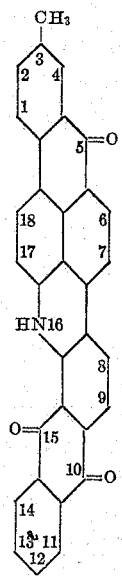

It is prepared by condensing 3-halo-9-phthalimido-methyl benzanthrone with α-aminoanthraquinone and fusing the resulting condensation product with alkali. The dye contains in the 3-position a residue of the phthalimidomethyl group presumably converted during the condensation reaction to the methyl group.

The only known intermediate resembling 3-halo-9-phthalimidomethyl benzanthrone is 10-halo-3-(ω-phthaliminomethyl) benzanthrone which is characterized by the following formula:

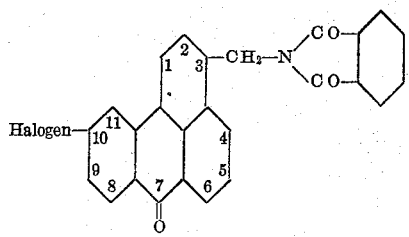

and is prepared by heating the 10-halogen derivative with chloromethylphthalimide in the presence of nitrobenzene and zinc chloride for several hours at 130–150° C.

Even though the 10-halogen derivative of the foregoing 3-phthalimidomethyl compound is an isomer of 3-halo-9-phthalimidomethyl benzanthrone, they are not equivalent, since the condensation product of the former with α-aminoanthraquinone is incapable of ring closure to form a pyridine ring.

The preparation of 3-halo-9-phthalimidomethyl benzanthrone, which is capable of condensing with α-aminoanthraquinone to form a pyradine ring, constitutes the object of the present invention. The object is accomplished by reacting a benzanthrone, in which the 3-position is occupied by a halogen, such as bromine or chlorine, and the 9-position is unoccupied, i. e., free of a substituent group, with an N-hydroxymethylphthalimide in the presence of concentrated sulfuric acid. This compound is not only valuable as a colorant, pigment, and intermediate for dyestuffs, but on base splitting to the phthalamic acid yields a dyestuff intermediate which is also useful as a colorant in dyeing nylon and wool and as a pigment in ink bases.

In practicing the present invention, one gram mol of 3-bromo- or 3-chloro-benzanthrone, in which the 9-position is unoccupied, is dissolved in 96% sulfuric acid at a temperature ranging from 10 to 80° C., and to the solution is added one molecular equivalent (in 6% molar excess) of N-hydroxymethylphthalimide. The mixture is allowed to stand, preferably with stirring, for a period of time ranging from several hours to several days at a temperature between 20–40° C. to 145° C. After the condensation reaction is complete, the reaction mixture is poured over ice, the precipitate filtered off, washed several times, and dried. The precipitated product may be used as such as a dyestuff intermediate or subjected to condensation with α-aminoanthraquinone and alkali, and fusing the resulting compound to yield an Indanthrene Olive Green B type dyestuff.

The N-hydroxymethylphthalimides which may be employed are N-hydroxymethylphthalimide itself, a substituted N-hydroxymethylphthalimide wherein one or more substituents may be present in the 3- to 6-positions of the benzene nucleus. Thus, there are included such representative N-hydroxymethylphthalimides as:

N-hydroxymethyl-3-methylphthalimide
N-hydroxymethyl-4-methylphthalimide
N-hydroxymethyl-4,5-dibromophthalimide
N-hydroxymethyl-4-chlorophthalimide
N-hydroxymethyl-3,4-dichlorophthalimide
N-hydroxymethyl-3-nitrophthalimide
N-hydroxymethyl-4-nitrophthalimide
N-hydroxymethyl-5-aminophthalimide
N-hydroxymethyl-6-aminophthalimide.

The N-hydroxymethylphthalimides are readily prepared by boiling formalin solution with a phthalimide.

Instead of employing an N-hydroxymethylphthalimide in the condensation reaction, molecular equivalents of a phthalimide and formaldehyde or a formaldehyde producing compound, such as paraformaldehyde, may be used.

The invention will be more fully described in conjunction with the following specific examples. It should be understood, however, that these examples are given by way of illustration only and the invention is not to be limited by the details set forth.

EXAMPLE I

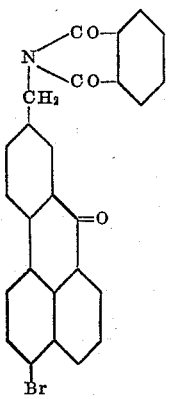

3-bromo-9-phthalimidomethyl benzanthrone 154.5 grams of 3-bromo-benzanthrone (powdered) were dissolved in 875 cc. of 96% sulfuric acid. After solution was complete, 95.4 grams of hydroxymethylphthalimide were dissolved and the solution heated at 80° C. for one hour and stored overnight at 30° C. The solution was poured in 5.5 liters of water, stirred well, filtered, and dried. The weight of the product was 234 grams or 100% of theory. Recrystallization from dichlorobenzene raised the melting point from 268–291° C. to 291–293° C.

The nitrogen and bromine analyses showed the following results:

N calculated ___ 2.99    Br calculated ___ 17.1
N found _____ 3.07    Br found _____ 17.8

EXAMPLE II

3-chloro-9-phthalimidomethyl benzanthrone

Example I was repeated with the exception that 154.5 grams of 3-bromo-benzanthrone were replaced by an equivalent amount of 3-chloro-9-phthalimidomethyl benzanthrone.

The term "halo" as used herein and in the claims is meant to include only the bromo- and chloro-derivatives.

This application is a continuation-in-part of our application Serial No. 60,396, filed November 16, 1948, now United States Patent 2,536,984, dated January 2, 1951.

While we have disclosed the preferred embodiments of our invention and the preferred modes of carrying the same into effect, it will be readily apparent to those skilled in the art that many variations may be made therein without departing from the spirit thereof. Accordingly, the scope of our invention is to be limited solely by the following claims.

We claim:

1. The process of preparing 3-halo-9-phthalimidomethyl benzanthrone in which the halo is selected from the class consisting of bromine and chlorine which comprises condensing in the presence of concentrated sulfuric acid one mol of said 3-halo-benzanthrone with one mol of N-hydroxymethylphthalimide.

2. The process of preparing 3-bromo-9-phthalimidomethyl benzanthrone which comprises condensing in the presence of concentrated sulfuric acid one mol of N-hydroxymethylphthalimide with one mol of 3-bromo-benzanthrone.

3. The process of preparing 3-chloro-9-phthalimidomethyl benzanthrone which comprises condensing in the presence of concentrated sulfuric acid one mol of N-hydroxymethylphthalimide with one mol of 3-chloro-benzanthrone.

DAVID I. RANDALL.
SAUL R. BUC.

REFERENCES CITED

The following references are of record in the file of this patent:

UNITED STATES PATENTS

| Number | Name | Date |
|---|---|---|
| 2,536,984 | Randall et al. | Jan. 2, 1951 |